US012705969B2

(12) United States Patent
Pettel

(10) Patent No.: US 12,705,969 B2
(45) Date of Patent: Aug. 11, 2026

(54) SYSTEM AND METHOD FOR OPTIMIZING ALERTS FOR A USER TECHNOLOGICAL FIELD

(71) Applicant: Honeywell International Inc., Charlotte, NC (US)

(72) Inventor: Noam Pettel, Kochav Yair (IL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/754,194

(22) Filed: Jun. 26, 2024

(65) Prior Publication Data

US 2026/0004650 A1 Jan. 1, 2026

(51) Int. Cl.

*G08B 21/18* (2006.01)
*G08B 21/10* (2006.01)
*G08B 27/00* (2006.01)

(52) U.S. Cl.

CPC ........... *G08B 21/182* (2013.01); *G08B 21/10* (2013.01); *G08B 27/005* (2013.01)

(58) Field of Classification Search

CPC ..... G08B 21/182; G08B 21/10; G08B 27/005
USPC .......................................................... 340/601
See application file for complete search history.

(56) References Cited

U.S. PATENT DOCUMENTS 9,055,925 B2 * 6/2015 Paquet ................... A61B 5/746
10,162,692 B2 * 12/2018 Bouta ................. G06F 11/0709
11,062,583 B1 * 7/2021 Sathaye ............. G08B 21/0233
2010/0109860 A1 * 5/2010 Williamson ........... G08B 29/16 340/508
2012/0260251 A1 * 10/2012 Collins ............... G06F 11/3072 718/100
2015/0254957 A1 * 9/2015 Wilson ................... G16H 50/20 340/573.1
2015/0339911 A1 * 11/2015 Coyne .................. G08B 27/005 340/517
2016/0026520 A1 * 1/2016 Bouta ................. G06F 11/0709 714/47.2
2017/0351787 A1 * 12/2017 Kapuschat ....... G06Q 10/06312
2018/0102047 A1 * 4/2018 Wilson ................. A61B 5/0205
2024/0235922 A1 * 7/2024 Agrawal ............. H04L 41/0604

* cited by examiner

*Primary Examiner* — Zhen Y Wu

(74) *Attorney, Agent, or Firm* — Alston & Bird LLP

(57) ABSTRACT

A method for optimizing alerts for a user is disclosed. The method comprises monitoring a plurality of alerts of one or more alert types within a predefined time period; determining a count of the plurality of alerts of each alert type within the predefined time period; determining the count of the plurality of alerts of each alert type exceeds a predefined threshold level within the predefined time period; triggering a storm alert corresponding to the plurality of alerts of each alert type upon determining the count of the plurality of alerts of each alert type exceeds the predefined threshold level, wherein the storm alert corresponds to an alert triggered when the plurality of alerts of each alert type is occurred multiple times within the predefined time period; and displaying a notification related to the storm alert and information related to the storm alert, to a user.

17 Claims, 7 Drawing Sheets

SYSTEM AND METHOD FOR OPTIMIZING ALERTS FOR A USER TECHNOLOGICAL FIELD

TECHNOLOGICAL FIELD

The present disclosure relates to an alert management, and more particularly relates to a system and a method for optimizing alerts for a user.

BACKGROUND

In digital technology and interconnected systems, issue of alert management within the interconnected systems has become increasingly pressing. As organizations rely more heavily on digital infrastructure to conduct business operations, sheer volume of alerts generated by various monitoring systems has reached overwhelming levels. The alerts, ranging from system errors to potential security threats, flood users' screens and inboxes, often causing alert fatigue and hindering effective incident response. Typically, one of the primary challenge in alert management system is the repetition of alerts of same type within short timeframes. The redundancy of alerts not only clutters monitoring interfaces but also distracts users from identifying and addressing genuine incidents promptly. Further, multiplication of alerts across multiple channels, including email and system logs, exacerbates the problem, making it difficult for the users to prioritize and distinguish critical events from routine notifications.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In one example embodiment, a method for optimizing alerts for a user is disclosed. The method comprises monitoring, via at least one processor, a plurality of alerts of one or more alert types within a predefined time period. The one or more alert types comprises at least one of threat alerts, asset management alerts, exposure alerts, health alerts, or operational alerts. The method further comprises determining, via the at least one processor, a count of the plurality of alerts of each alert type of the one or more alert types within the predefined time period. The count corresponds to a number of occurrences of the plurality of alerts of each alert type within the predefined time period. The method further comprises determining, via the at least one processor, the count of the plurality of alerts of each alert type exceeds a predefined threshold level within the predefined time period. The predefined threshold level corresponds to a maximum number of alerts of each alert type allowable within the predefined time period. Further, the method comprises triggering, via the at least one processor, a storm alert corresponding to the plurality of alerts of each alert type upon determining the count of the plurality of alerts of each alert type exceeds the predefined threshold level within the predefined time period. The storm alert corresponds to an alert triggered when the plurality of alerts of each alert type occurred multiple times within the predefined time period. Thereafter, the method comprises displaying, via the at least one processor, a notification related to the storm alert and information related to the storm alert, to a user. The information related to the storm alert comprises a severity level of the storm alert, an identifier, at least description of the storm alert, internet protocol (IP) address, or last event time.

In some embodiments, the method further comprises determining, via the at least on processor, the severity level of the storm alert based at least on a severity level of the plurality of alerts of each alert type that triggers a storm condition and a maximum severity level of the storm alert.

In some embodiments, the method further comprises suppressing, via the at least one processor, the plurality of alerts of each alert type subsequent to the storm alert within the predefined time period, based at least on the determined severity level of the storm alert.

In some embodiments, the threat alerts correspond to alerts related to security threats, such as breaches or suspicious activities. The asset management alerts correspond to alerts concerning asset management, such as inventory updates or maintenance schedule. The exposure alerts correspond to alerts related to exposure risks, such as data exposure or vulnerability disclosures. The health alerts correspond to alerts concerning health of infrastructure components. The operational alerts correspond to alerts related to operational issues, such as system failures or performance degradation.

In some embodiments, the severity level of the storm alert is configured to prioritize the storm alert over the plurality of alerts of each alert type within the predefined time period. In some embodiments, the predefined time period comprises at least one of minutes, hours, weeks, days, or years. In some embodiments, the storm alert is triggered to indicate a potential abnormal condition or an unauthorized activity.

In another example embodiment, a system for optimizing alerts for a user is disclosed. The system comprises a memory and at least one processor communicatively coupled to the memory. The at least one processor is configured to monitor a plurality of alerts of one or more alert types within a predefined time period. The one or more alert types comprises at least one of threat alerts, asset management alerts, exposure alerts, health alerts, or operational alerts. The at least one processor is further configured to determine a count of the plurality of alerts of each alert type of the one or more alert types within the predefined time period. The count corresponds to a number of occurrences of the plurality of alerts of each alert type within the predefined time period. The at least one processor is further configured to determine the count of the plurality of alerts of each alert type exceeds a predefined threshold level within the predefined time period. The predefined threshold level corresponds to a maximum number of alerts of each alert type allowable within the predefined time period. The at least one processor is further configured to trigger a storm alert corresponding to the plurality of alerts of each alert type upon determining the count of the plurality of alerts of each alert type exceeds the predefined threshold level within the predefined time period. The storm alert corresponds to an alert triggered when the plurality of alerts of each alert type occurred multiple times within the predefined time period.

Thereafter, the at least one processor is configured to display a notification related to the storm alert and information related to the storm alert, to a user. The information related to the storm alert comprises a severity level of the storm alert, an identifier, at least description of the storm alert, internet protocol (IP) address, or last event time.

In another example embodiment, a non-transitory machine-readable information storage medium is disclosed. The non-transitory machine-readable information storage medium comprises one or more instructions which when executed by at least one processor causes the at least one processor to monitor a plurality of alerts of one or more alert types within a predefined time period; wherein the one or more alert types comprises at least one of threat alerts, asset management alerts, exposure alerts, health alerts, or operational alerts; determine a count of the plurality of alerts of each alert type of the one or more alert types within the predefined time period, wherein the count corresponds to a number of occurrences of the plurality of alerts of each alert type within the predefined time period; determine the count of the plurality of alerts of each alert type exceeds a predefined threshold level within the predefined time period, wherein the predefined threshold level corresponds to a maximum number of alerts of each alert type allowable within the predefined time period; trigger a storm alert corresponding to the plurality of alerts of each alert type upon determining the count of the plurality of alerts of each alert type exceeds the predefined threshold level within the predefined time period. wherein the storm alert corresponds to an alert triggered when the plurality of alerts of each alert type occurred multiple times within the predefined time period; and display a notification related to the storm alert and information related to the storm alert, to a user, wherein the information related to the storm alert comprises a severity level of the storm alert, an identifier, at least description of the storm alert, internet protocol (IP) address, or last event time.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
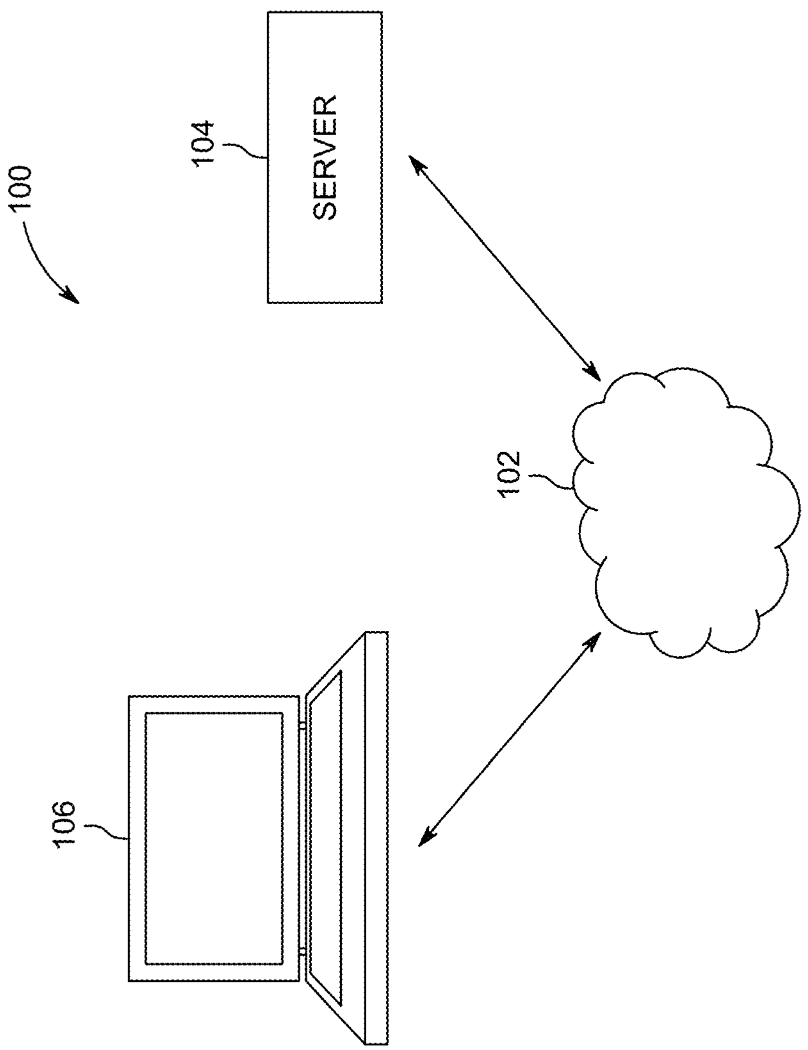
Figure 2:
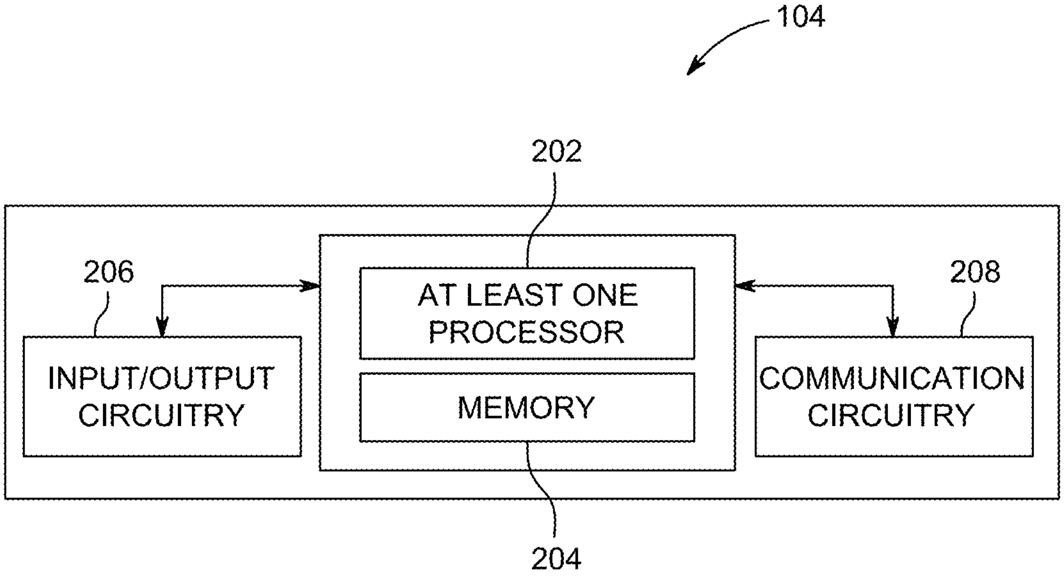
Figure 3:
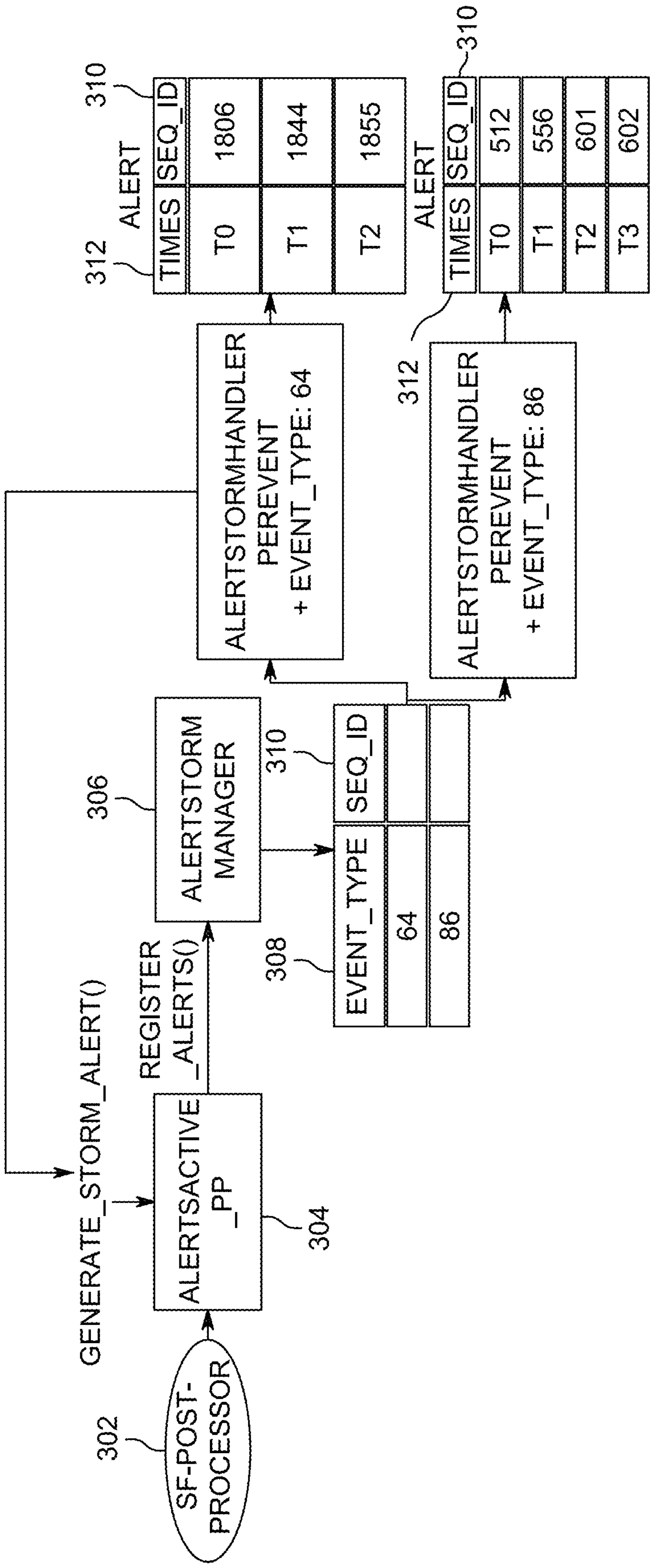
Figure 4:
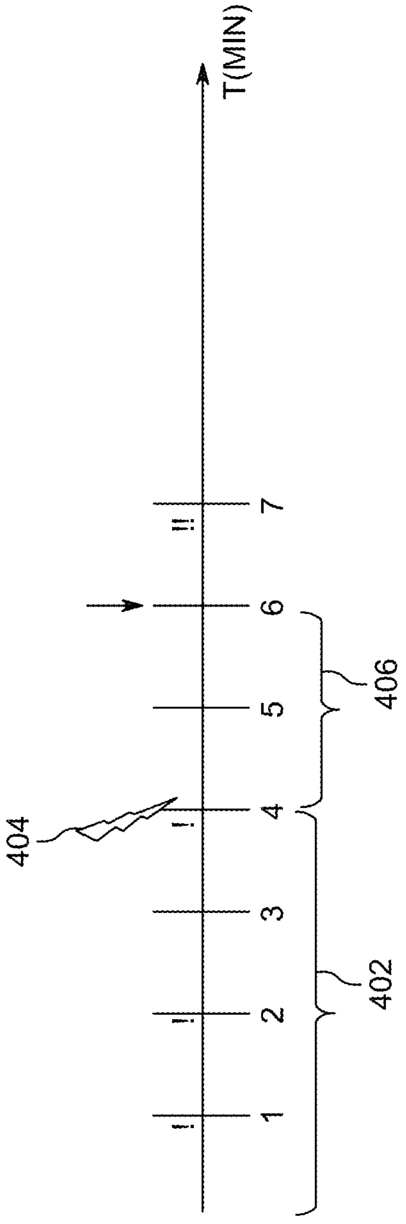
Figure 5:
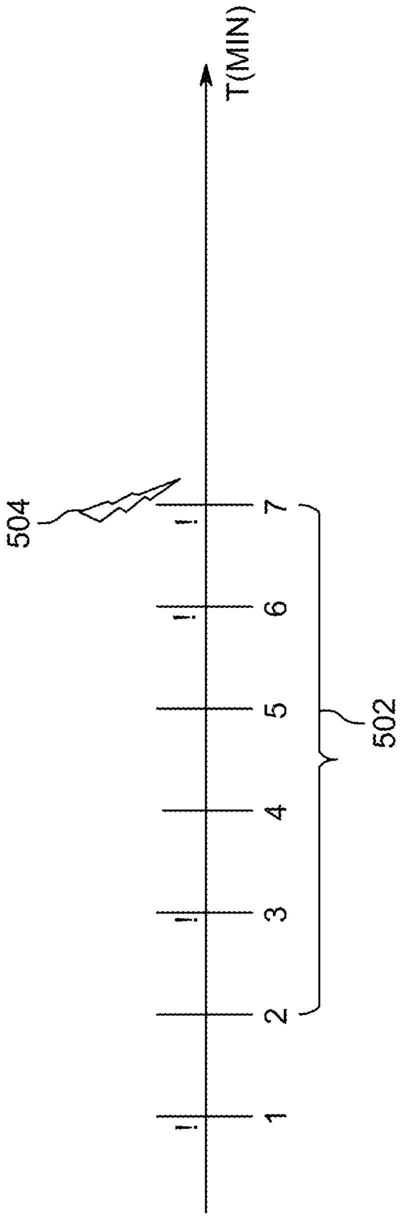
Figure 6:
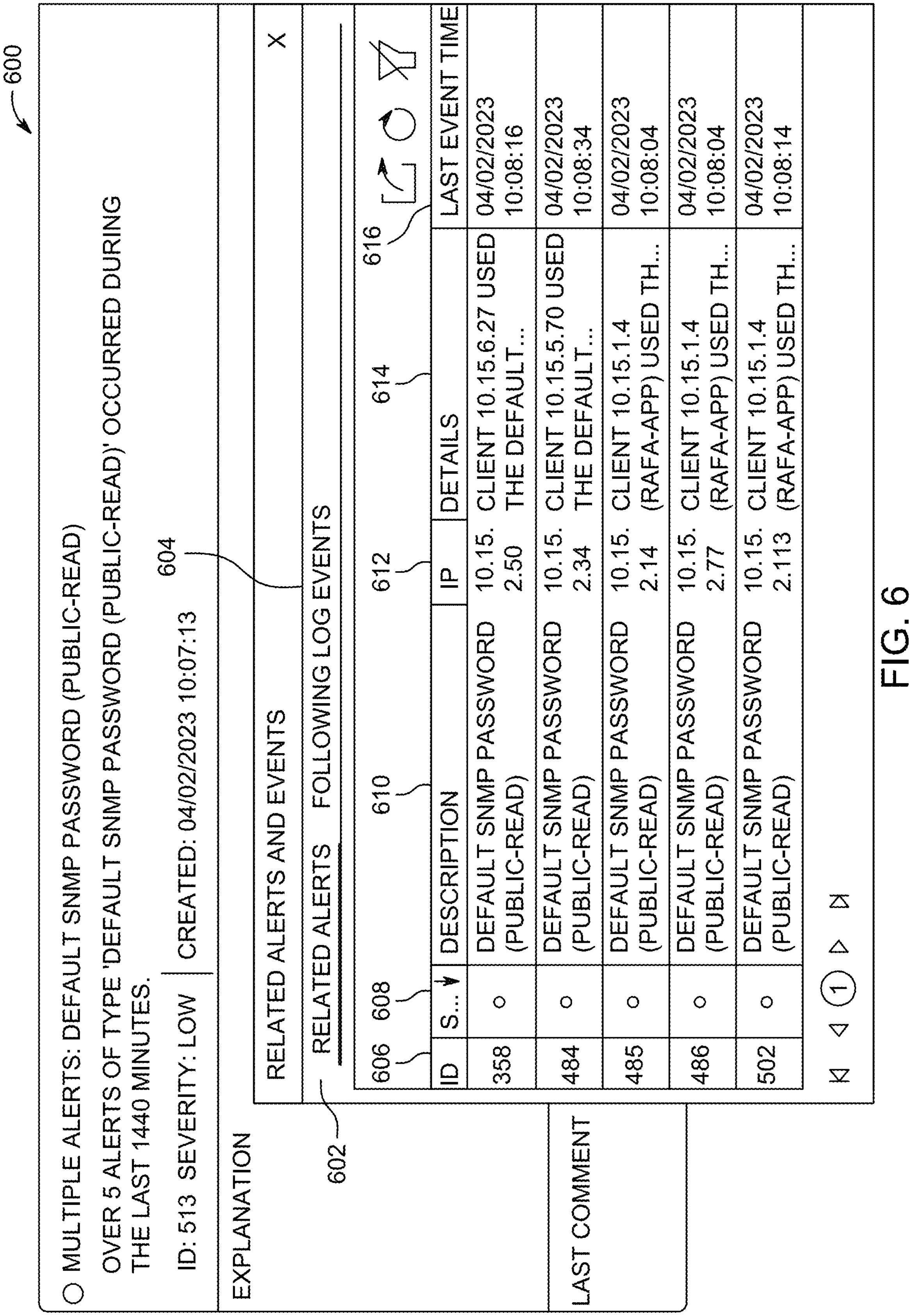
Figure 7:
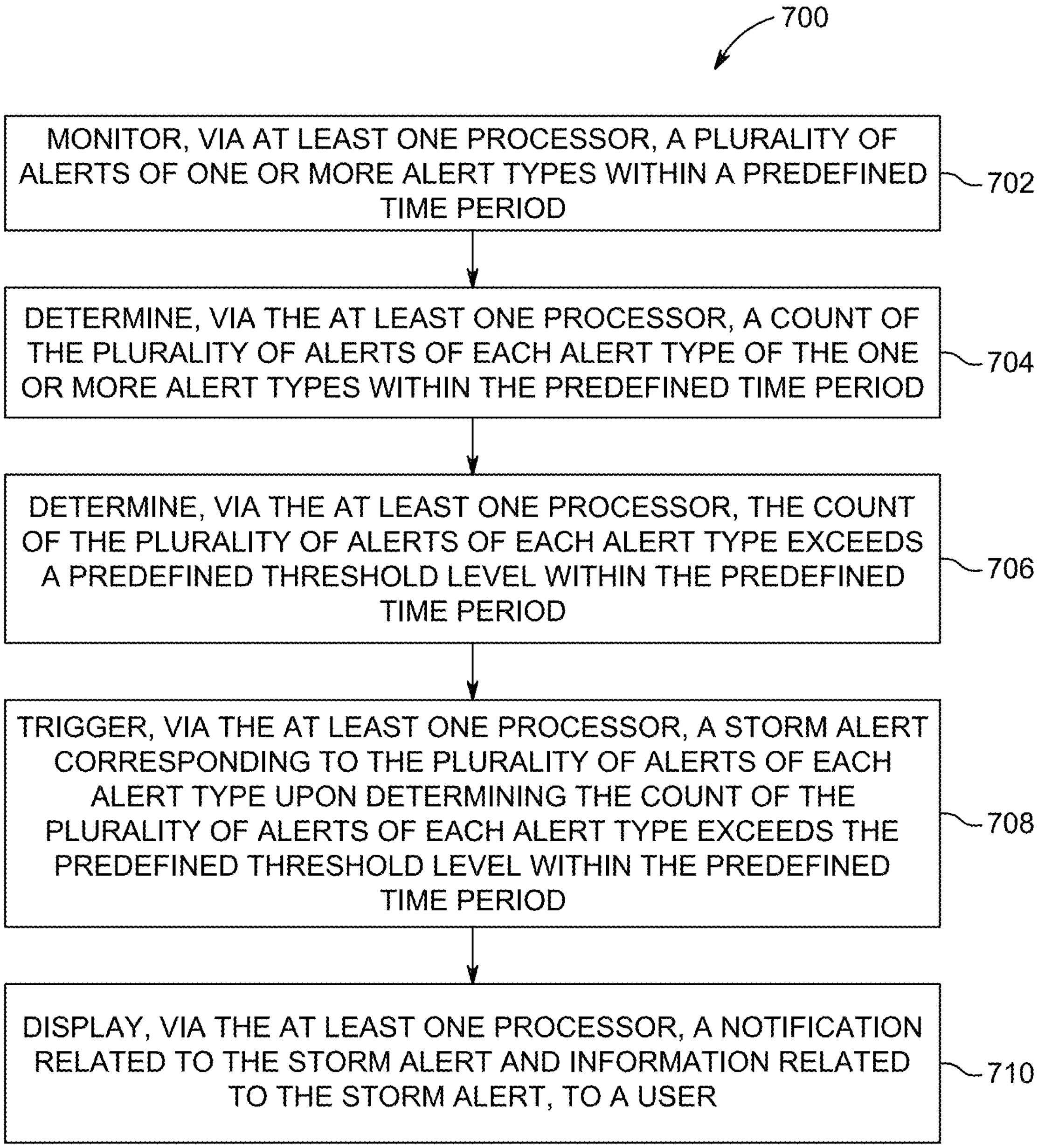

Having thus described certain example embodiments of the present disclosure in general terms, reference will hereinafter be made to the accompanying drawings, which are not necessarily drawn to scale, and wherein:

FIG. 1 illustrates a network diagram of a system for optimizing alerts for a user in accordance with an example embodiment of the present disclosure;

FIG. 2 illustrates a block diagram of a server in accordance with an example embodiment of the present disclosure;

FIG. 3 illustrates a system diagram for optimizing and segregating alerts for the user in accordance with an example embodiment of the present disclosure;

FIG. 4 illustrates an example scenario of optimizing the plurality of alerts and generating a storm alert in accordance with an example embodiment of the present disclosure;

FIG. 5 illustrates another example scenario of optimizing the plurality of alerts and generating the storm alert in accordance with an example embodiment of the present disclosure;

FIG. 6 illustrates a user interface (UI) showing information related to the storm alert to the user in accordance with an example embodiment of the present disclosure; and FIG. 7 illustrates a flowchart showing a method for optimizing alerts for the user in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the disclosure described herein such that embodiments may include fewer or more components than those shown in the figures while not departing from the scope of the disclosure. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of methods and system for optimizing alerts for a user. Embodiments may be configured to monitor a plurality of alerts of one or more alert types within a predefined time period. The one or more alert types may comprise at least one of threat alerts, asset management alerts, exposure alerts, health alerts, or operational alerts. Embodiments may be configured to determine a count of the plurality of alerts of each alert type of the one or more alert types within the predefined time period. The count may correspond to a number of occurrences of the plurality of alerts of each alert type within the predefined time period. Embodiments may be configured to determine the count of the plurality of alerts of each alert type exceeds a predefined threshold level within the predefined time period. The predefined threshold level may correspond to a maximum number of alerts of each alert type allowable within the predefined time period.

Embodiments may be configured to trigger a storm alert corresponding to the plurality of alerts of each alert type upon determining the count of the plurality of alerts of each alert type exceeds the predefined threshold level within the predefined time period. The storm alert may correspond to an alert triggered when the plurality of alerts of each alert type occurred multiple times within the predefined time period. Embodiments may be configured to display a notification related to the storm alert and information related to the storm alert, to a user. The information related to the storm alert may comprise a severity level of the storm alert, an identifier, at least description of the storm alert, internet protocol (IP) address, or last event time. Embodiments may be configured to determine the severity level of the storm alert based at least on a severity level of the plurality of alerts of each alert type that triggers a storm condition and a maximum severity level of the storm alert. The severity level of the storm alert may be configured to prioritize the storm alert over the plurality of alerts of each alert type within the predefined time period. Embodiments may be configured to suppress the plurality of alerts of each alert type subsequent to the storm alert within the predefined time period, based at least on the determined severity level of the storm alert. It may be noted that the storm alert may be triggered to indicate a potential abnormal condition or an unauthorized activity.

FIG. 1 illustrates a network diagram of a system 100 for optimizing alerts for a user, in accordance with an example embodiment of the present disclosure. The system 100 may comprise a network 102, a server 104, and a user device 106.

In some embodiments, the network 102 may be a communication network such as internet or a cloud network, that may be configured to allow the server 104 and the user device 106 to communicate with each other through wired network, wireless network, or a combination of both. In some embodiments, the network 102 may refer to as a distributed infrastructure that is configured to exchange data, information, and resources among interconnected server and the user device 106. The network 102 may be designed to facilitate communication and collaboration across various locations, devices, and platforms. Those skilled in the art will recognize that wired devices may include, but are not limited to, wired networks such as Wide Area Networks (WANs) or Local Area Networks (LANs), while wireless devices may include wireless communications established via Radio Frequency (RF) signals or infrared signals. Various devices in the system 100 may connect to the network 102 in accordance with various wired and wireless communication protocols such as Transmission Control Protocol and Internet Protocol (TCP/IP), User Datagram Protocol (UDP), and 2G, 3G, or 4G communication protocols.

In some embodiments, the server 104 may be a computer or software module that is configured to provide centralized resources, data, or services to the user device 106 operated by the user. The server 104 may be configured to handle and manage one or more computational tasks and data processing within the system 100. In some embodiments, the server 104 may include storage systems, such as hard drives or storage arrays, to store and manage large volumes of data and information accessible to network users. In some embodiments, the server 104 may further provide centralized control and management capabilities, allowing network administrators to configure, monitor, and maintain network resources, security settings, and user access permissions from a single location.

In some embodiments, the server 104 may comprise a memory (not shown) and at least one processor (not shown). The at least one processor may be communicatively coupled to the memory. The detailed description of the memory and the at least one processor will be described later in conjunction with FIG. 2. In some embodiments, the server 104 may be configured to monitor the plurality of alerts of the one or more alert types within a predefined time period. The one or more alert types may comprise at least one of threat alerts, asset management alerts, exposure alerts, health alerts, or operational alerts.

In some embodiments, the threat alerts may correspond to alerts related to security threats. The security threats may comprise breaches or suspicious activities. The asset management alerts may correspond to alerts concerning asset management such as inventory updates or maintenance schedule. The exposure alerts may correspond to alerts related to exposure risks. Exposure risks may correspond to data exposure or vulnerability disclosures. The health alerts may correspond to alerts concerning health of infrastructure components. The operational alerts may correspond to alerts related to operational issues such as system failures or performance degradation. In some embodiments, the server 104 may track the plurality of alerts of the one or more alert types. The plurality of alerts of each alert type may correspond to the plurality of alerts exhibiting similar characteristics such as alerts related to a common zone, alerts related to source and origin, time sensitivity etc.

In some embodiments, the server 104 may be configured to determine a count of the plurality of alerts of each alert type of the one or more alert types within the predefined time period. The count may correspond to a number of occurrences of the plurality of alerts of each alert type within the predefined time period. The predefined time period may comprise at least one of minutes, hours, weeks, days, or years. The server 104 may keep a real-time tally of the number of occurrences of the monitored plurality of alerts of each alert type of the one or more alert types. In some embodiments, counting process of the plurality of alerts of the one or more alert types may involve recording each alert instance as the plurality of alerts occurs. Further, the server 104 may increment a counter for each of the plurality of alerts of the one or more alert types. The server 104 may maintain separate counters for the plurality of alerts of each alert type. The separate counters for the plurality of alerts of each alert type may ensure that the server 104 may accurately track frequency of the plurality of alerts of each alert type. In one example, the server 104 may determine the count of 50 of threat alerts. Further, the server 104 may determine the count of 30 of asset management alerts. Further, the server 104 may determine the count of 25 of health alerts.

In some embodiments, the server 104 may be configured to determine whether the count of the plurality of alerts of each alert type exceeds a predefined threshold level within the predefined time period. The predefined threshold level may correspond to a maximum number of alerts of each alert type allowable within the predefined time period. The plurality of alerts of each alert type of the one or more alert types may have an associated maximum number of allowable occurrences. The server 104 may compare the determined count of the plurality of alerts of each alert type with the predefined threshold corresponding to the plurality of alerts of each alert type. In some embodiments, the predefined threshold level may be established based at least on the acceptable frequency of the plurality of alerts of each alert type and the organization's tolerance for the plurality of alerts of each alert type.

In one example, the predefined threshold level corresponding to the threat alerts may correspond to 40 alerts within the predefined time period of 5 hours. Further, the predefined threshold level corresponding to the asset management alerts may correspond to 25 alerts within the predefined time period of 10 hours. Further, the predefined threshold level corresponding to the health alerts may correspond to 20 alerts within the predefined time period of 7 hours. The server 104 may compare the determined count of the threat alerts i.e., 50 alerts with the predefined threshold level of the threat alerts i.e., 40 alerts. In another example, the server 104 may compare the determined count of the asset management alerts with the predefined threshold level of the asset management alerts. In another example, the server 104 may compare the determined count of the health alerts i.e., 25 alerts with the predefined threshold level of the health alerts i.e., 20 alerts.

In some embodiments, the server 104 may further be configured to trigger a storm alert corresponding to the plurality of alerts of each alert type upon determining the count of the plurality of alerts of each alert type exceeds the predefined threshold level within the predefined time period. The storm alert may correspond to an alert triggered when the plurality of alerts of each alert type occurred multiple times within the predefined time period. The storm alert may further correspond to a condition triggered when the plurality of alerts of each alert type may be raised multiple times within a short time frame. The storm alert may suggest an event or issue that need to be addressed immediately or require an appropriate action.

In some embodiments, the server 104 may be configured to determine the severity level of the storm alert based at least on a severity level of the plurality of alerts of each alert type that may trigger a storm condition and a maximum severity level of the storm alert. The severity level of the storm alert may be configured to prioritize the storm alert over the plurality of alerts of each alert type within the predefined time period.

In some embodiments, the severity level of the storm alert may be grouped into a plurality of severity levels. The plurality of severity levels may comprise a high severity level. In one example, the high severity level may be displayed to the user by a "Red" colour. The plurality of severity levels may further comprise a middle severity level. The middle severity level may be displayed to the user by a "Yellow" colour. Further, the plurality of severity levels may comprise a low severity level. The low severity level may be displayed to the user by a "Blue" colour. It may be noted that colours have been mentioned only for illustration purposes. In some embodiments, the severity level of the storm alerts may be displayed in some other forms as well, without departing from the scope of the disclosure.

In some embodiments, the high severity level may indicate critical issues that requires immediate attention. The high severity level may comprise at least one of a potential security breach or a system failure. Further, the medium severity level may comprise at least one of important issues that should be addressed promptly but are not immediately critical. The medium severity level may comprise at least one of upcoming maintenance tasks or moderate system anomalies. Further, the low severity level may correspond to less urgent issues that need to be monitored but do not require immediate action. The low severity level may comprise at least one of minor irregularities or informational updates.

In one example, the server 104 may determine the severity level of the storm alert corresponding to the threat alerts as high severity level. Therefore, the threat alerts may be represented by "Red" color. The high severity level may indicate the potential security breach. Further, the server 104 may determine the severity level of the storm alert corresponding to the asset management alerts as a medium severity level. Therefore, the asset management alerts may be represented by the "Yellow" color. The medium severity level may indicate need to manage the upcoming maintenance task. Further, the server 104 may determine the severity level of the storm alert corresponding to the health alerts again as a medium severity level. The medium severity level may indicate suggesting a possible issue with equipment that needs to be addressed.

In some embodiments, to prevent alert fatigue and to avoid the user with redundant notifications, the server 104 may suppress the plurality of alerts of each alert type subsequent to the storm alert within the predefined time period, based at least on the determined severity level of the storm alerts. In some embodiments, additional plurality of alerts of each alert type may be logged but not immediately displayed as new plurality of alerts of the one or more alert types. The suppression of the plurality of alerts of the one or more alert types may reduce noise and may allow the user to focus on addressing the storm alert. Further, the server 104 may be configured to eliminate redundant plurality of alerts of the one or more alert types.

In some embodiments, the server 104 may be configured to display a notification related to the storm alert and information related to the storm alert, to the user. The information related to the storm alert may comprise at least one of a severity level of the storm alert, an identifier, at least description of the storm alert, internet protocol (IP) address, or last event time. The server 104 may interface with the user device 106 having a user-friendly dashboard or a graphical user interface (GUI) where the plurality of alerts of the one or more alert types, notifications related to the storm alert and the information related to the storm alert are displayed. The user-friendly dashboard is a central hub for the user to monitor the health and security status of each alert type in real time. The user may correspond to system administrators, cybersecurity professionals, or alert monitoring professionals.

In some embodiments, the server 104 may be configured to convert the storm alert severity into a log. In some embodiments, the server 104 may be configured to determine the count of the plurality of alerts of each alert type does not exceeds the predefined threshold level within the predefined time period. Thereafter, the server 104 may be configured to display the plurality of alerts of each alert type to the user on the user device 106 when the plurality of alerts of each alert type does not exceeds the predefined threshold level corresponding to the plurality of alerts of each alert type. In some embodiments, the server 104 may provide a summarized data corresponding to the plurality of alert types to the user that is easy for the user to analyze the data related to the plurality of alerts.

The user device 106 may comprise a graphical user interface (GUI) that provides a user-friendly platform for the user to display and interact with the system 100. The GUI may be web-based, accessed through a browser, or through a dedicated software application installed on desktop computers, laptops, tablets, or smartphone. The user device 106 may be equipped by a user or other service professionals responsible for viewing the plurality of alerts of each alert type. In some embodiments, the user, via the user device 106, may limit the plurality of alerts of each alert type. In some embodiments, limiting the plurality of alerts of each alert type may correspond to defining the predefined threshold level for the plurality of alert types of each alert type. In some embodiments, the user device 106 may receive the summarized data from the server 104. The summarized data may correspond to details related to the plurality of alerts of each alert type. In some embodiments, the user device 106 may include personal computers such as desktop computers, laptop computers, tablets, smartphones, or mobile devices.

In some embodiments, the user device 106 may provide feedback mechanisms for the user to report issues encountered or suggest improvements. The feedback mechanism may involve collecting and analyzing the user responses to the plurality of alerts of the one or more alert types, including the actions taken and the outcomes of the taken actions. Further, by leveraging Artificial Intelligence/machine Learning (AI/ML) techniques, the system 100 may learn from the feedback mechanism to refine the predefined threshold level corresponding to the plurality of alerts of each alert type, and the plurality of the severity levels. In one example, if the user consistently marks the plurality of alerts of each alert type as non-critical or ignore the plurality of alerts of each alert type, then the system 100 may be configured to reduce the frequency of the plurality of alerts of each alert type. Further, if the user frequently takes urgent action on a specific type of alert, then the system 100 may increase priority or lower the predefined threshold level for similar types of alerts. The feedback mechanism may ensure that the storm alert may become more accurate and user-centric over time, and also reduce alert fatigue.

It will be apparent to one skilled in the art that above-mentioned components of the system 100 have been provided only for illustration purposes, without departing from the scope of the disclosure.

FIG. 2 illustrates a block diagram of a server 104, in accordance with an example embodiment of the present disclosure. The server 104 may comprise at least one processor 202 and a memory 204. FIG. 2 is described in conjunction with FIG. 1.

In some embodiments, the at least one processor 202 may correspond to a controller for executing one or more operations within the server 104. In some embodiments, the at least one processor 202 may be configured to monitor the plurality of alerts of the one or more alert types within the predefined time period.

In some embodiments, the at least one processor 202 may be configured to determine the count of the plurality of alerts of each alert type of the one or more alert types within the predefined time period. The count may correspond to the number of occurrences of the plurality of alerts of each alert type within the predefined time period. The predefined time period may comprise at least one of the minutes, hours, weeks, days, or years. The at least one processor 202 may keep the real-time tally of the number of occurrences of the monitored plurality of alerts of the one or more alert types. In some embodiments, counting process of the plurality of alerts of the one or more alert types may involve recording each alert instance as the plurality of alerts of the one or more alert types occurs. Further, the at least one processor 202 may increment the counter for each of the plurality of alerts of the one or more alert types. The at least one processor 202 may maintain separate counters for the plurality of alerts of each alert type. The separate counters for the plurality of alerts of each alert type may ensure that the at least one processor 202 may accurately track frequency of the plurality of alerts of each alert type. The one or more alert types may comprise at least one of the threat alerts, the asset management alerts, the exposure alerts, the health alerts, or the operational alerts.

In some embodiments, the threat alerts may correspond to alerts related to security threats. The security threats may comprise breaches or suspicious activities. The asset management alerts may correspond to alerts concerning asset management. The asset management may comprise inventory updates or maintenance schedule. The exposure alerts may correspond to alerts related to exposure risks. Exposure risks may correspond to data exposure or vulnerability disclosures. The health alerts may correspond to alerts concerning health of infrastructure components. The operational alerts may correspond to alerts related to operational issues. The operational issues may comprise system failures or performance degradation. In some embodiments, the at least one processor 202 may track the plurality of alerts of the one or more alert types. The plurality of alerts of each alert type may correspond to the plurality of alerts exhibiting similar characteristics. The plurality of alerts may be further categorized into one or more domains. In one example, the at least one processor 202 may determine a count of 50 threat alerts. Further, the at least one processor 202 may determine a count of 30 asset management alerts. Further, the at least one processor 202 may determine another count of 25 health alerts.

In some embodiments, the at least one processor 202 may be configured to determine whether the count of the plurality of alerts of each alert type exceeds the predefined threshold level within the predefined time period. The predefined threshold level may correspond to the maximum number of alerts of each alert type allowable within the predefined time period. The plurality of alerts of each alert type of the one or more alert types may have an associated maximum number of allowable occurrences. The at least one processor 202 may compare the determined count of the plurality of alerts of each alert type of the one or more alert types with the predefined threshold corresponding to the plurality of alerts of each alert type of the one or more alert types within the predefined time period. In some embodiments, the predefined threshold level may be established based at least on the acceptable frequency of the plurality of alerts of the one or more alert types and the organization's tolerance for the plurality of alerts of the one or more alert types.

In another example, in an industrial control system, the plurality of alerts are generated having alert types as threat alerts, asset management alerts, exposure alerts, health alerts, and operational alerts. The predefined threshold level corresponding to the threat alert may correspond to 120 alerts within the predefined time period of 48 hours. Further, the predefined threshold level corresponding to the asset management alerts may correspond to 125 alerts within the predefined time period of 50 hours. Further, the predefined threshold level corresponding to the health alert may correspond to 80 alerts within the predefined time period of 48 hours. The at least one processor 202 may compare the determined count of the plurality of alerts of each alert type with the predefined threshold level corresponding to the plurality of alerts of each alert type. The at least one processor 202 may compare a count of 50 alerts within the predefined time period of 48 hours with predefined threshold level of 120 alerts. The at least one processor 202 may compare a count of 130 alerts within the predefined time period of 50 hours with the predefined threshold level of 125 alerts. Further, the at least one processor 202 may compare the determined count of the health alerts with the predefined threshold level of the health alerts. The at least one processor 202 may compare a count of 125 alerts within the predefined time period of 48 hours with the predefined threshold level of 80 alerts.

In some embodiments, the at least one processor 202 may be configured to trigger the storm alert corresponding to the plurality of alerts of each alert type upon determining the count of the plurality of alerts of each alert type exceeds the predefined threshold level within the predefined time period. The storm alert may correspond to an alert triggered when the plurality of alerts of each alert type occurred multiple times within the predefined time period. The storm alert may further correspond to a condition triggered when the plurality of alerts of each alert type may be raised multiple times within a short time frame. The storm alert may suggest an important event or issue that needs to be addressed immediately or require an appropriate action.

Successively, the at least one processor 202 may be configured to determine the severity level of the storm alert based at least on a severity level of the plurality of alerts of each alert type that may trigger a storm condition and a maximum severity level of the storm alert. The severity level of the storm alert may be configured to prioritize the storm alert over the plurality of alerts of each alert type within the predefined time period. In some embodiments, the severity level of the storm alert may be grouped into a plurality of severity levels. The plurality of severity levels may comprise a high severity level. The high severity level may be displayed to the by a “Red” colour. The plurality of severity levels may further comprise a middle severity level. The middle severity level may be displayed to the user by “Yellow” colour. Further, the plurality of severity levels may comprise a low severity level. The low severity level may be displayed to the user by “Blue” colour. It may be noted that colours have been mentioned only for illustration purposes. In some embodiments, the severity level of the storm alerts may be displayed in some other forms as well, without departing from the scope of the disclosure.

In some embodiments, the high severity level may indicate critical issues that may require immediate attention. The high severity level may comprise, but is not limited to a potential security breach or system failure. Further, the medium severity level may indicate important issues that should be addressed promptly but are not immediately critical. The medium severity level may comprise, but is not limited to the upcoming maintenance tasks or moderate system anomalies. Further, the low severity level may indicate less urgent issues that need to be monitored but do not require immediate action. The low severity level may comprise, but is not limited to minor irregularities or informational updates.

As discussed earlier, each alert type may be assigned with a different severity level and each severity level may be assigned with a distinct color code. These color codes may be used to flash over the user device 106 such that the user is able to clearly look into the plurality of alerts of the storm alert generated and determine severity level. The at least one processor 202 may determine the severity level of the storm alert corresponding to the threat alert as high severity level. The high severity level may be represented by the “Red” color. The high severity level may indicate the potential security breach. Further, the at least one processor 202 may determine the severity level of the storm alert corresponding to the asset management alerts as medium severity level. The medium severity level may be represented by the “Yellow” color. The medium severity level may indicate need to manage the upcoming maintenance task. In some embodiments, the at least one processor 202 may determine the severity level of the storm alert corresponding to the health alerts again as medium severity level. The medium severity level may indicate suggesting a possible issue with equipment that needs to be addressed.

In some embodiments, to prevent alert fatigue and to avoid the user with redundant notifications, the at least one processor 202 may suppress the plurality of alerts of each alert type subsequent to the storm alert within the predefined time period, based at least on the determined severity level of the storm alerts suppress the plurality of alerts of each alert type. In some embodiments, additional plurality of alerts of each alert type may be logged but not immediately displayed as new plurality of alerts of the one or more alert types. The suppression of the plurality of alerts of the one or more alert types may reduce noise and may allow the user to focus on addressing the storm alert. Further, the at least one processor 202 may be configured to eliminate redundant plurality of alerts of the one or more alert types.

In some embodiments, the at least one processor 202 may be configured to display the notification related to the storm alert and information related to the storm alert, to the user. The information related to the storm alert may comprise the severity level of the storm alert, the identifier, the at least description of the storm alert, the internet protocol (IP) address, or the last event time. The at least one processor 202 may interface with the user-friendly dashboard or the graphical user interface (GUI) where the plurality of alerts of the one or more alert types, the notifications related to the storm alert and the information related to the storm alert are displayed. The user-friendly dashboard is the central hub for the user to monitor the health and security status of the system in real time. The user may correspond to the system administrators, and the cybersecurity professionals.

In some embodiments, the server 104 may be configured to convert the storm alert severity into a log. Further, the server 104 may be configured to determine the predefined threshold level corresponding to the plurality of alerts of each alert type. Further, the server 104 may be configured to display the plurality of alerts of each alert type when the plurality of alerts of each alert type does not exceeds the predefined threshold level corresponding to the plurality of alerts of each alert type. Successively, the at least one processor 202 may be configured to determine whether the count of the plurality of alerts surpasses the threshold corresponding to the plurality of alerts of each of the at least one type based at least on the comparison. The determination of whether the count of the plurality of alerts of each alert type may surpass the predefined threshold level corresponding to the plurality of alerts of each alert type may identify when the plurality of alerts of each alert type may indicate the potential problem that may require immediate attention.

In one example, the at least one processor 202 may determine that the count of the 50 threat alert may surpass the predefined threshold level of the 40 alerts within the predefined time period corresponding to the threat alert based at least on the comparison between the 50 alerts and the 40 alerts within the predefined time period. Further, the at least one processor 202 may determine that the count of the 30 asset management alert may surpass the predefined threshold level of thee 25 alerts within the predefined time period corresponding to the asset management alert based at least on the comparison between the 30 alerts and the 25 alerts within the predefined time period. Further, the at least one processor 202 may determine that the count of the 25 health alert may surpass the predefined threshold alerts of the 20 alerts corresponding to the health alert based at least on the comparison between the 25 alerts and the 20 alerts within the predefined time period.

A description of the algorithm and code enabling an embodiment of the present disclosure is described below. The algorithm is configured to set the predefined threshold level and also the predefined time period.

```
[modules.alert_active]
enabled=true
custom_severity_to_hash=true
keep_blacklisted_events=false
[modules.alert_active.alert_storm]
storm_logic_enabled=false
num_alerts_threshold=20
time_period_minutes_threshold=1440
```

The description of the algorithm and code enabling another embodiment of the present disclosure is described below:

```
"PLC_STOP_COMMAND_ISSUED": {
"id":46,
"enabled": true,
"save_pcap": true,
"severity":3,
"health_alert": false,
"syslog_alert": true,
"email_alert": true,
"script_alert": false,
"storm_enabled": false }
```

Further, the at least one processor 202 is configured to determine the severity level of the storm alert using the below-mentioned formula:

```
severity= min(orig_alert_severity+1, ALERT_LEVEL_CRITICAL)
```

In some embodiments, the orig_alert_severity may refer to the severity level of the original plurality of alerts of the at least one type that triggered the storm alert. Further, the ALERT_LEVEL_CRITICAL may correspond to the maximum severity level that the storm alert may reach. The ALERT_LEVEL_CRITICAL may correspond to alert level critical. Further, the algorithm and the code determining the severity of the storm alert may ensure that the severity of the storm alert may be slightly higher than the severity of the original plurality of alerts of the at least one type, capped at the critical alert level. Further, the at least one processor 202 may prioritize the storm alert appropriately based at least on the severity of the underlying issue. In one example, the orig_alert_severity may be considered as 24 and the ALERT_LEVEL_CRITICAL may be considered as 28. Since, the severity as calculated may be minimum. Therefore {(24+1)=25}. Further, the final severity of the storm alert may be determined as 25.

It will be apparent to one skilled in the art that above-mentioned algorithms and the formula have been provided only for illustration purposes, without departing from the scope of the disclosure.

In some embodiments, the at least one processor 202 may include suitable logic, circuitry, and/or interfaces that are operable to execute one or more instructions stored in the memory 204 to perform predetermined operations. In some embodiments, the at least one processor 202 may be configured to store the plurality of alerts of the at least one type, count of the plurality of alerts of the at least one type, the threshold corresponding to the plurality of alerts of each of the at least one type, the storm alert, the time frame, and the information related to the storm alert in the memory 204 communicatively coupled to the at least one processor 202. In one embodiment, the at least one processor 202 may be configured to decode and execute any instructions received from one or more other electronic devices or server(s). The at least one processor 202 may be configured to execute one or more computer-readable program instructions, such as program instructions to carry out any of the functions described in this description. Further, the processor may be implemented using the at least one processor 202 technologies known in the art. Examples of the at least one processor 202 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the memory 204 may be configured to store a set of instructions and data executed by the at least one processor 204. Further, the memory 204 may include the one or more instructions that are executable by the at least one processor 202 to perform specific operations. The memory 204 may be configured to store the plurality of alerts of the one or more alert types. The memory 204 may be configured to include the instructions to monitor the plurality of alerts of the one or more alert types. The memory 204 may be configured to include the instructions to determine the count of the plurality of alerts of each alert type of the one or more alert types. Further, the memory 204 may be configured to include the instructions to determine the count of the plurality of alerts of each alert type exceeds the predefined threshold level within the predefined time period.

Further, the memory 204 may be configured to include the instructions to trigger the storm alert corresponding to the plurality of alerts of each alert type upon determining the count of the plurality of alerts of each alert type exceeds the predefined threshold level within the predefined time period. The storm alert may correspond to the condition triggered when the specific plurality of alerts of the one or more alert types may be raised multiple times within the predefined time period. Further, the memory 204 may be configured to include the instructions to determine the severity of the storm alert severity based at least on the plurality of alerts of the one or more alert types, the time frame, the predefined threshold level, and the count of the plurality of alerts of one or more alert types. Further, the memory 204 may be configured to include the instructions to display the notification related to the storm alert and information related to the storm alert to the user.

It will be apparent to one skilled in the art that the one or more instructions stored in the memory 204 enable the hardware of the system 100 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the server 104 may further comprise an input/output circuitry 206. The input/output circuitry 206 may enable a user to communicate or interface with the system 100, via the user device 106. The user device 106 may include N number of user devices. In some embodiments, the input/output circuitry 206 may act as a medium to transmit input from the interface to and from the system 100. In some embodiments, the input/output circuitry 206 may refer to the hardware and software components that facilitate the exchange of information between the user device 106 and the system 100. In one example, the server 104 may include a graphical user interface (GUI) (not shown) as input circuitry to allow the users to input data. The input/output circuitry 206 may include various input devices such as keyboards, barcode scanners, GUI for the users to provide data and various output devices such as displays, printers for the one or more users to receive data. In another example, the input/output circuitry 206 may include various output circuitry such as a display. The input/output circuitry 206 may further display information related to the storm alert to the user on the user device 106.

In some embodiments, the server 104 may further comprise a communication circuitry 208. The communication circuitry 208 may allow the server 104 to exchange data or information with other systems or apparatuses. Further, the communication circuitry 208 may include network interfaces, protocols, and software modules responsible for sending and receiving data or information. In some embodiments, the communication circuitry 208 may include Ethernet ports, Wi-Fi adapters, or communication protocols like HTTP or MQTT for connecting with other systems. The communication circuitry 208 may further include components such as communication modules (e.g., Wi-Fi, Ethernet, cellular), transceivers, antennas, and protocols (e.g., TCP/IP, MQTT, SNMP) for exchanging data with other systems or network devices. The communication circuitry 208 may allow the system 100 to stay up-to-date. In some embodiments, the communication circuitry 208 may enable seamless communication between the user device 106, application server (not shown), the at least one processor 202, and the memory 204.

In an embodiment, the present disclosure may be a progressive web app (PWA). The PWA may be an app that's built using web platform technologies, but that provides a user experience like that of a platform-specific app. The PWA may be installed on a device. The PWA may operate while offline and in the background. The PWA may can integrate with the device. The PWA may further integrate with other applications installed on the device. In an embodiment, the present disclosure may provide a good user experience even when the device has intermittent network connectivity. Further, the present disclosure may perform operations in the background, even when the main app is not running.

It will be apparent to one skilled in the art the above-mentioned components of the server 104 have been provided only for illustration purposes, without departing from the scope of the disclosure.

FIG. 3 illustrates a system diagram 300 for optimizing and segregating the alerts for a user, in accordance with an example embodiment of the present disclosure. FIG. 3 is described in conjunction with FIGS. 1-2.

In some embodiments, the system 100 may comprise a sf-post-processor 302. The sf-post-processor 302 may correspond to the at least one processor 202. The sf-post-processor 302 may monitor AlertsActive_PP 304. The AlertsActive_PP 304 may correspond to the plurality of alerts of each alert type. Further, the AlertsActive_PP 304 may be registered to an alert storm manager 306. The alert storm manager 306 may be configured to segregate the plurality of alerts into event Event_Type 308 and Seq_ID 310. In one example, the alert storm manager 306 may determine 64 alerts and 86 alerts of each Event_Type 308 of the one or more alert types. Further, each alert type may further be described with time 312 and Seq_ID 310 corresponding to the time. In one example embodiment, for the 64 alerts of Event_Type 308 of the one or more alert types, at time t0, having 1806 Seq_id may be generated. Further, at time t1, the alert having seq_id 1844 may be generated. Further, at time t2, the alert having seq_id 1855 may be generated. In another example embodiment, for the 86 alerts of each alert type of the one or more alert types, at time t0, an alert having seq_id 512 may be generated. Further, at time t1, the alert having seq_id 556 may be generated. Further, at time t2, the alert having seq_id 601 may be generated. Further, at time t3, the alert having seq_id 602 (as shown in 310) may be generated.

Further, the alert storm manager 306 may determine the count of the plurality of alerts of each alert type exceeds the predefined threshold level within the predefined time period. Further, the alert storm manager 306 may trigger the storm alert corresponding to the plurality of alerts of each alert type upon determining the count of the plurality of alerts of each alert type exceeds the predefined threshold level within the predefined time period. The alert storm manager 306 may further suppress the plurality of alerts of each alert type subsequent to the storm alert within the predefined time period.

FIG. 4 illustrates an example scenario of optimizing the plurality of alerts and generating the storm alert, in accordance with an example embodiment of the present disclosure.

In some embodiments, the at least one processor 202 may be configured to manage the plurality of alerts of the one or more alert types by monitoring the frequency of the plurality of alerts of each alert type of the one or more alert types. The at least one processor 202 may be configured to trigger the storm alert when the count of the plurality of alerts of each alert type exceeds the predefined threshold level within the predefined time period. The predefined threshold level may correspond to the maximum number of alerts of each alert type allowable within the predefined time period. Further, the storm alert algorithm may suppress the redundant plurality of alerts of each of the one or more alert types, and may restart determining the count of the plurality of alerts of each alert type of the one or more alert types within the predefined time period.

In one example, the predefined threshold level corresponding to the plurality of alerts of the one or more alert types may correspond to 3 alerts within a predefined time period of 5 minutes. The plurality of alerts of the at least one type may include threat alerts, asset management alerts, exposure alerts, health alerts, or operational alerts. The at least one processor 202 may monitor the plurality of alerts of the one or more alert types. The at least one processor 202 may determine the count of the plurality of alerts of each alert type of the one or more alert types within the predefined time period. The predefined time frame may correspond to a 5-minute window.

In one example, the count of the plurality of alerts of each alert type of the one or more alert types may reach in 3-4 minutes (as shown by 402). The at least one processor 202 may encounter the plurality of alerts of each alert type of the one or more alert types at 00:01:00, at 00:02:00, and at 00:04:00. Further, the count of the plurality of alerts of each alert type exceeds the predefined threshold level within the predefined time period. Further, the storm alert 404 corresponding to the plurality of alerts of each alert type may be triggered upon determining the count of the plurality of alerts of each alert type i.e., 3 alerts in 4 minutes exceeds the predefined threshold level i.e., 3 alerts in 5 minutes within the predefined time period. The storm alert 404 may indicate an event that needs attention.

Further, after triggering the storm alert 404, the at least one processor 202 may suppress the plurality of alerts of each alert type subsequent to the storm alert 404 within the predefined time period, based at least on the determined severity level of the storm alert. The plurality of alerts of each alert type subsequent to the storm alert may be suppressed within the suppression period (as shown by 406). The suppression period may correspond to the time period from 00:04:00 to 00:05:00. Further, after suppressing the plurality of alerts of each alert type subsequent to the storm alert 404, the at least one processor 202 may reset the count and may begin a new monitoring interval starting from 00:06:00. The restart counting may ensure that any new patterns of the plurality of alerts of the one or more alert types may be detected afresh.

FIG. 5 illustrates another example scenario of optimization of the plurality of alerts and generating the storm alert, in accordance with an example embodiment of the present disclosure.

In one example, the predefined threshold level corresponding to the plurality of alerts of the one or more alert types may correspond to 3 alerts within 5 minutes. The plurality of alerts of the at least one type may include threat alerts, asset management alerts, exposure alerts, health alerts, or operational alerts. The at least one processor 202 may monitor the plurality of alerts of the one or more alert types. The at least one processor 202 may determine the count of the plurality of alerts of each alert type of the one or more alert types within the predefined time period. The predefined time frame may correspond to a 5-minute window.

The count of the plurality of alerts of each alert type of the one or more alert types may reach 3 within 5 minutes. The at least one processor 202 may encounter the plurality of alerts of each alert type of the one or more alert types at 00:03:00, at 00:06:00, and at 00:07:00. Further, the count of the plurality of alerts of each alert type exceeds the predefined threshold level within the predefined time period. Further, the storm alert 504 corresponding to the plurality of alerts of each alert type may be triggered upon determining the count of the plurality of alerts of each alert type i.e., 3 alerts in 5 minutes (as shown by 502) exceeds the predefined threshold level i.e., 3 alerts in 5 minutes within the predefined time period. The storm alert 504 may indicate an event that needs attention. The storm alert 504 may be triggered at 00:07:00.

Further, after triggering the storm alert 504, the at least one processor 202 may suppress the plurality of alerts of each alert type subsequent to the storm alert 504 within the predefined time period, based at least on the determined severity level of the storm alert 504. The plurality of alerts of each alert type subsequent to the storm alert 504 may be suppressed within the suppression period. Further, after suppressing the plurality of alerts of each alert type subsequent to the storm alert 504, the at least one processor 202 may reset the count and may begin a new monitoring interval. The restart counting may ensure that any new patterns of the plurality of alerts of the one or more alert types may be detected afresh.

FIG. 6 illustrates a user interface (UI) 600 showing information related to the storm alert to the user, in accordance with an example embodiment of the present disclosure.

In some embodiments, the UI 600 may display information related to the storm alert. The UI 600 may be designed to provide a clear, concise, and comprehensive view of the plurality of alerts of the one or more alert types. The UI 600 may ensure the user may quickly understand the situation and may take appropriate action. In some embodiments, the UI 600 may comprise a plurality of tabs. The plurality of tabs may correspond to related alerts 602, and following log events 604. Further, the related alerts may comprise a plurality of attributes as shown in different columns. The plurality of attributes may have identification (ID) 606, severity 608, description 610, Internet Protocol (IP) 612, Details 614, and last event time 616.

In one example, for ID 358, the severity 608 may be low, the description 610 may be Default SNMP password (public-read), IP 612 may be 10.15.2.50, details 614 may be Client 10.15.6.27 used the default . . . , and the last event time 616 may be Apr. 2, 2023 10:08:16. For ID 484, the severity 608 may be low, description 610 may be Default SNMP password (public-read), IP 612 may be 10.15.2.34, details 614 may be Client 10.15.5.70 used the default, and the last event time 616 may be Apr. 2, 2023 10:08:34. Further, for ID 485, the severity 608 may be low, the description 610 may be Default SNMP password (public-read), IP 612 may be 10.15.2.14, details 614 may be Client 10.15.1.4 (rafa-app) used the default, and the last event time 616 may be Apr. 2, 2023 10:08:04. Further, for ID 486, the severity 608 may be low, description 610 may be Default SNMP password (public-read), IP 612 may be 10.15.2.77, details 614 may be Client 10.15.1.4 (rafa-app) used the default, and the last event time 616 may be Apr. 2, 2023 10:08:04. For ID 502, the severity 608 may be low, description 610 may be Default SNMP password (public-read), IP 612 may be 10.15.2.113, details 614 may be Client 10.15.1.4 (rafa-app) used the default, and the last event time 616 may be Apr. 2, 2023 10:08:14.

FIG. 7 illustrates a flowchart 700 showing a method for optimizing alerts for the user, in accordance with an example embodiment of the present disclosure. FIG. 7 is described in conjunction with FIGS. 1-6.

At operation 702, the at least one processor 202 may be configured to monitor the plurality of alerts of the one or more alert types within the predefined time period. The one or more alert types may comprise at least one of the threat alerts, the asset management alerts, the exposure alerts, the health alerts, or the operational alerts. In some embodiments, the threat alerts may correspond to alerts related to security threats. The security threats may comprise breaches or suspicious activities. The asset management alerts may correspond to alerts concerning asset management. The asset management may comprise inventory updates or maintenance schedule. The exposure alerts may correspond to alerts related to exposure risks. Exposure risks may correspond to data exposure or vulnerability disclosures. The health alerts may correspond to alerts concerning health of infrastructure components. The operational alerts may correspond to alerts related to operational issues. The operational issues may comprise system failures or performance degradation. In some embodiments, the at least one processor 202 may track the plurality of alerts of the one or more alert types. The plurality of alerts of each alert type may correspond to the plurality of alerts exhibiting similar characteristics. The plurality of alerts may be further categorized into one or more domains.

At operation 704, the at least one processor 202 may be configured to determine the count of the plurality of alerts of each alert type of the one or more alert types within the predefined time period. The count may correspond to the number of occurrences of the plurality of alerts of each alert type within the predefined time period. The predefined time period may comprise at least one of the minutes, hours, weeks, days, or years. The at least one processor 202 may keep the real-time tally of the number of occurrences of the monitored plurality of alerts of the one or more alert types. In some embodiments, the counting process of the plurality of alerts of the one or more alert types may involve recording each instance of each of the plurality of alerts of each alert type as the plurality of alerts of the one or more alert types occurs. Further, the at least one processor 202 may increment the counter for each of the plurality of alerts of the one or more alert types. The at least one processor 202 may maintain separate counters for the plurality of alerts of each alert type. The separate counters for the plurality of alerts of each alert type may ensure that the at least one processor 202 may accurately track frequency of the plurality of alerts of each alert type.

For example, the at least one processor 202 may determine the count of 50 of the threat alerts. Further, the at least one processor 202 may determine the count of 30 of the Asset management alerts. Further, the at least one processor 202 may determine the count of 25 of the health alerts.

At operation 706, the at least one processor 202 may be configured to determine the count of the plurality of alerts of each alert type exceeds the predefined threshold level within the predefined time period. The predefined threshold level may correspond to the maximum number of alerts of each alert type allowable within the predefined time period. The plurality of alerts of each alert type of the one or more alert types may have an associated maximum number of allowable occurrences. The at least one processor 202 may compare the determined count of the plurality of alerts of each alert type of the one or more alert types with the predefined threshold corresponding to the plurality of alerts of each alert type of the one or more alert types within the predefined time period. In some embodiments, the predefined threshold level may be established based at least on the acceptable frequency of the plurality of alerts of the one or more alert types and the organization's tolerance for the plurality of alerts of the one or more alert types.

For example, the predefined threshold level corresponding to the threat alerts may correspond to 40 alerts within the predefined time period. Further, the predefined threshold level corresponding to the Asset management alerts may correspond to 25 alerts within the predefined time period. Further, the predefined threshold level corresponding to the health alert may correspond to 20 alerts within the predefined time period. The at least one processor 202 may compare the determined count of the plurality of alerts of each alert type of the one or more alert types with the predefined threshold level corresponding to the plurality of alerts of each alert type of the one or more alert types.

Further, the at least one processor 202 may compare the determined count of the threat alert with the predefined threshold level of the threat alert. The at least one processor 202 may compare the 50 alerts within the predefined time period with the 40 alerts within the predefined time period. Further, the at least one processor 202 may compare the determined count of the asset management alerts with the predefined threshold level of the asset management alerts. The at least one processor 202 may compare the 30 alerts within the predefined time period with the 25 alerts within the predefined time period. Further, the at least one processor 202 may compare the determined count of the health alert with the predefined threshold level of the health alerts. The at least one processor 202 may compare the 25 alerts within the predefined time period with the 20 alerts within the predefined time period.

At operation 708, the at least one processor 202 may be configured to trigger the storm alert corresponding to the plurality of alerts of each alert type upon determining the count of the plurality of alerts of each alert type exceeds the predefined threshold level within the predefined time period. The storm alert may correspond to the alert triggered when the plurality of alerts of each alert type occurred multiple times within the predefined time period. The storm alert may further correspond to the condition triggered when the plurality of alerts of each alert type may be raised multiple times within the short time frame. The storm alert may suggest an important event or issue that may need to be addressed.

Successively, the at least one processor 202 may be configured to determine the severity level of the storm alert based at least on a severity level of the plurality of alerts of each alert type that may trigger a storm condition and a maximum severity level of the storm alert. The severity level of the storm alert may be configured to prioritize the storm alert over the plurality of alerts of each alert type within the predefined time period.

In some embodiments, the severity level of the storm alert may be grouped into a plurality of severity levels. The plurality of severity levels may comprise a high severity level. The high severity level may be represented by red. The plurality of severity levels may further comprise a middle severity level. The middle severity level may be represented by yellow. Further, the plurality of severity levels may comprise a low severity level. The low severity level may be represented by blue.

In some embodiments, the high severity level may indicate critical issues that may require immediate attention. The high severity level may comprise, but is not limited to a potential security breach or system failure. Further, the medium severity level may indicate important issues that should be addressed promptly but are not immediately critical. The medium severity level may comprise, but is not limited to the upcoming maintenance tasks or moderate system anomalies. Further, the low severity level may indicate less urgent issues that need to be monitored but do not require immediate action. The low severity level may comprise, but is not limited to minor irregularities or informational updates.

For example, the at least one processor 202 may determine the severity level of the storm alert corresponding to the threat alert as high severity level. The high severity level may be represented by RED. The high severity level may indicate the potential security breach. Further, the at least one processor 202 may determine the severity level of the storm alert corresponding to the asset management alert as medium severity level. The medium severity level may be represented by YELLOW. The medium severity level may indicate need to manage the upcoming maintenance task. In some embodiments, the at least one processor 202 may determine the severity level of the storm alert corresponding to the health alert again as medium severity level. The medium severity level may indicate suggesting a possible issue with equipment that needs to be addressed.

In some embodiments, to prevent alert fatigue and to avoid the user with redundant notifications, the at least one processor 202 may suppress the plurality of alerts of each alert type subsequent to the storm alert within the predefined time period, based at least on the determined severity level of the storm alerts suppress the plurality of alerts of each alert type. In some embodiments, additional plurality of alerts of each alert type may be logged but not immediately displayed as new plurality of alerts of the one or more alert types. The suppression of the plurality of alerts of the one or more alert types may reduce noise and may allow the user to focus on addressing the storm alert. Further, the at least one processor 202 may be configured to eliminate redundant plurality of alerts of the one or more alert types.

At operation 710, the at least one processor 202 may be configured to display the notification related to the storm alert and information related to the storm alert, to the user. The information related to the storm alert may comprise the severity level of the storm alert, the identifier, the at least description of the storm alert, the internet protocol (IP) address, or the last event time. The at least one processor 202 may interface with the user-friendly dashboard or the graphical user interface (GUI) where the plurality of alerts of the one or more alert types, the notifications related to the storm alert and the information related to the storm alert are displayed. The user-friendly dashboard is the central hub for the user to monitor the health and security status of the system in real time. The user may correspond to the system administrators, and the cybersecurity professionals.

In one example, the predefined threshold level corresponding to the plurality of alerts of the one or more alert types may correspond to 2 alerts within 5 minutes. The plurality of alerts of the at least one type may include the threat alerts, asset management alerts, exposure alerts, health alerts, or operational alerts. The at least one processor 202 may monitor the plurality of alerts of the one or more alert types. The at least one processor 202 may determine the count of the plurality of alerts of each alert type of the one or more alert types within the predefined time period. The predefined time frame may correspond to a 5-minute window.

The count of the plurality of alerts of each alert type of the one or more alert types may reach 2 in 4 minutes. The at least one processor 202 may encounter the plurality of alerts of each alert type of the one or more alert types at 00:01:00, and at 00:04:00. Further, the count of the plurality of alerts of each alert type exceeds the predefined threshold level within the predefined time period. Further, the storm alert corresponding to the plurality of alerts of each alert type may be triggered upon determining the count of the plurality of alerts of each alert type i.e., 2 alerts in 4 minutes exceeds the predefined threshold level i.e., 2 alerts in 5 minutes within the predefined time period. The storm alert may indicate an event that needs attention.

Further, after generating the storm alert, the at least one processor 202 may suppress the plurality of alerts of each alert type subsequent to the storm alert within the predefined time period, based at least on the determined severity level of the storm alert. The plurality of alerts of each alert type subsequent to the storm alert may be suppressed within the suppression period. The suppression period may correspond to the time period from 00:04:00 to 00:05:00.

Further, after suppressing the plurality of alerts of each alert type subsequent to the storm alert, the at least one processor 202 may reset the count and may begin a new monitoring interval starting from 00:06:00. The restart counting may ensure that any new patterns of the plurality of alerts of the one or more alert types may be detected afresh.

In some embodiments, a non-transitory machine-readable information storage medium is disclosed. The non-transitory machine-readable information storage medium may comprise one or more instructions which when executed by at least one processor for monitoring a plurality of alerts of one or more alert types within the predefined time period. The one or more alert types may comprise at least one of the threat alerts, the asset management alerts, the exposure alerts, the health alerts, or the operational alerts.

Further, the non-transitory machine-readable information storage medium may comprise one or more instructions which when executed by the at least one processor for determining the count of the plurality of alerts of each alert type of the one or more alert types within the predefined time period. The count may correspond to the number of occurrences of the plurality of alerts of each alert type within the predefined time period.

Further, the non-transitory machine-readable information storage medium may comprise one or more instructions which when executed by the at least one processor for determining the count of the plurality of alerts of each alert type exceeds the predefined threshold level within the predefined time period. The predefined threshold level may correspond to the maximum number of alerts of each alert type allowable within the predefined time period.

Further, the non-transitory machine-readable information storage medium may comprise one or more instructions which when executed by the at least one processor for triggering the storm alert corresponding to the plurality of alerts of each alert type upon determining the count of the plurality of alerts of each alert type exceeds the predefined threshold level within the predefined time period. The storm alert may correspond to the alert triggered when the plurality of alerts of each alert type may be triggered multiple times within the predefined time period.

Thereafter, the non-transitory machine-readable information storage medium may comprise one or more instructions which when executed by the at least one processor for displaying the notification related to the storm alert and information related to the storm alert, to the user. The information related to the storm alert may comprise the severity level of the storm alert, the identifier, the at least description of the storm alert, the internet protocol (IP) address, or the last event time.

The present disclosure streamlines limiting the plurality of alerts of the one or more alert types. The present disclosure may enhance the use of alert management within the system. In some embodiments, by monitoring and counting the plurality of alerts of each alert type of the one or more alert types and generating the storm alert when the predefined threshold level may surpass, the system may effectively avoid flooding the user with excessive alerts and notification noise, such as syslog entries and emails. Limiting the plurality of alerts of the one or more alert types may reduce alert fatigue, allowing the user to focus on critical issues without being overwhelmed by redundant notifications.

In some embodiments, the generation of the storm alert may provide valuable indications of potential incidents, enabling the user to recognize and respond to significant events promptly. The present disclosure may ensure that critical alerts receive the attention they deserve, improving overall incident response and management. Further, the system's ability to display information about the storm alert, further aids the user in making informed decisions and taking appropriate actions. In some embodiments, the disclosed system may enhance the user experience, may improve the system's monitoring efficiency, and strengthen cybersecurity measures by ensuring timely and focused responses to significant events.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

monitoring, via at least one processor, a plurality of alerts of one or more alert types within a predefined time period, wherein the one or more alert types comprises at least one of threat alerts, asset management alerts, exposure alerts, health alerts, or operational alerts;

determining, via the at least one processor, a count of the plurality of alerts of each alert type of the one or more alert types within the predefined time period, wherein the count corresponds to a number of occurrences of the plurality of alerts of each alert type within the predefined time period;

determining, via the at least one processor, the count of the plurality of alerts of each alert type exceeds a predefined threshold level within the predefined time period, wherein the predefined threshold level corresponds to a maximum number of alerts of each alert type allowable within the predefined time period;

triggering, via the at least one processor, a storm alert corresponding to the plurality of alerts of each alert type upon determining the count of the plurality of alerts of each alert type exceeds the predefined threshold level within the predefined time period, wherein the storm alert corresponds to an alert triggered when the plurality of alerts of each alert type occurred multiple times within the predefined time period;

suppressing, via the at least one processor, the plurality of alerts of each alert type subsequent to the storm alert within the predefined time period, based at least on the determined severity level of the storm alert; and displaying, via the at least one processor, a notification related to the storm alert and information related to the storm alert, to a user, wherein the information related to the storm alert comprises a severity level of the storm alert, an identifier, at least description of the storm alert, internet protocol (IP) address, or last event time.

2. The method of claim 1 further comprising determining, via the at least one processor, the severity level of the storm alert based at least on a severity level of the plurality of alerts of each alert type that triggers a storm condition and a maximum severity level of the storm alert.

3. The method of claim 1, wherein the threat alerts correspond to alerts related to security threats, the asset management alerts correspond to alerts concerning asset management, the exposure alerts correspond to alerts related to exposure risks, the health alerts correspond to alerts concerning health of infrastructure components, and the operational alerts correspond to alerts related to operational issues.

4. The method of claim 1, wherein the severity level of the storm alert is configured to prioritize the storm alert over the plurality of alerts of each alert type within the predefined time period.

5. The method of claim 1, wherein the storm alert is triggered to indicate a potential abnormal condition or an unauthorized activity.

6. The method of claim 1, wherein the predefined time period comprises at least one of minutes, hours, weeks, days, or years.

7. A system comprising:

a memory; and at least one processor communicatively coupled to the memory, wherein the at least one processor is configured to:

monitor a plurality of alerts of one or more alert types within a predefined time period, wherein the one or more alert types comprises at least one of threat alerts, asset management alerts, exposure alerts, health alerts, or operational alerts;

determine a count of the plurality of alerts of each alert type of the one or more alert types within the predefined time period, wherein the count corresponds to a number of occurrences of the plurality of alerts of each alert type within the predefined time period;

determine the count of the plurality of alerts of each alert type exceeds a predefined threshold level within the predefined time period, wherein the predefined threshold level corresponds to a maximum number of alerts of each alert type allowable within the predefined time period;

trigger a storm alert corresponding to the plurality of alerts of each alert type upon determining the count of the plurality of alerts of each alert type exceeds the predefined threshold level within the predefined time period, wherein the storm alert corresponds to an alert triggered when the plurality of alerts of each alert type occurred multiple times within the predefined time period;

suppress the plurality of alerts of each alert type subsequent to the storm alert within the predefined time period, based at least on the determined severity level of the storm alert; and display a notification related to the storm alert and information related to the storm alert, to a user, wherein the information related to the storm alert comprises a severity level of the storm alert, an identifier, at least description of the storm alert, internet protocol (IP) address, or last event time.

8. The system of claim 7, wherein the at least one processor is further configured to determine the severity level of the storm alert based at least on a severity level of the plurality of alerts of each alert type that triggers a storm condition and a maximum severity level of the storm alert.

9. The system of claim 7, wherein the threat alerts correspond to alerts related to security threats, the asset management alerts correspond to alerts concerning asset management, the exposure alerts correspond to alerts related to exposure risks, the health alerts correspond to alerts concerning health of infrastructure components, and the operational alerts correspond to alerts related to operational issues.

10. The system of claim 7, wherein the severity level of the storm alert is configured to prioritize the storm alert over the plurality of alerts of each alert type within the predefined time period.

11. The system of claim 7, wherein the storm alert is triggered to indicate a potential abnormal condition or an unauthorized activity.

12. The system of claim 7, wherein the predefined time period comprises at least one of minutes, hours, weeks, days, or years.

13. A non-transitory machine-readable information storage medium comprising one or more instructions which when executed by at least one processor causes the at least one processor to:

monitor a plurality of alerts of one or more alert types within a predefined time period, wherein the one or more alert types comprises at least one of threat alerts, asset management alerts, exposure alerts, health alerts, or operational alerts;

determine a count of the plurality of alerts of each alert type of the one or more alert types within the predefined time period, wherein the count corresponds to a number of occurrences of the plurality of alerts of each alert type within the predefined time period;

determine the count of the plurality of alerts of each alert type exceeds a predefined threshold level within the predefined time period, wherein the predefined threshold level corresponds to a maximum number of alerts of each alert type allowable within the predefined time period;

trigger a storm alert corresponding to the plurality of alerts of each alert type upon determining the count of the plurality of alerts of each alert type exceeds the predefined threshold level within the predefined time period, wherein the storm alert corresponds to an alert triggered when the plurality of alerts of each alert type occurred multiple times within the predefined time period;

suppress the plurality of alerts of each alert type subsequent to the storm alert within the predefined time period, based at least on the determined severity level of the storm alert; and display a notification related to the storm alert and information related to the storm alert, to a user, wherein the information related to the storm alert comprises a severity level of the storm alert, an identifier, at least description of the storm alert, internet protocol (IP) address, or last event time.

14. The non-transitory machine-readable information storage medium of claim 13, wherein the at least one processor is further configured to determine the severity level of the storm alert based at least on a severity level of the plurality of alerts of each alert type that triggers a storm condition and a maximum severity level of the storm alert.

15. The non-transitory machine-readable information storage medium of claim 13, wherein the threat alerts correspond to alerts related to security threats, the asset management alerts correspond to alerts concerning asset management, the exposure alerts correspond to alerts related to exposure risks, the health alerts correspond to alerts concerning health of infrastructure components, and the operational alerts correspond to alerts related to operational issues.

16. The non-transitory machine-readable information storage medium of claim 13, wherein the severity level of the storm alert is configured to prioritize the storm alert over the plurality of alerts of each alert type within the predefined time period.

17. The non-transitory machine-readable information storage medium of claim 13, wherein the storm alert is triggered to indicate a potential abnormal condition or an unauthorized activity.

* * * * *